United States Patent [19]
Kuwayama et al.

[11] Patent Number: 4,889,016
[45] Date of Patent: Dec. 26, 1989

[54] HYDRAULIC SERVO REGULATING SYSTEMS IN AN AUTOMATIC TRANSMISSION

[75] Inventors: Yoshinari Kuwayama, Tokoname; Fumitomo Yokoyama, Anjo; Masakatsu Miura, Kariya, all of Japan

[73] Assignee: Aisin-Warner Kabushiki Kaisha, Aichi, Japan

[21] Appl. No.: 172,722

[22] PCT Filed: Jun. 30, 1987

[86] PCT No.: PCT/JP87/00455
§ 371 Date: Mar. 1, 1988
§ 102(e) Date: Mar. 1, 1988

[87] PCT Pub. No.: WO88/00305
PCT Pub. Date: Jan. 14, 1988

[30] Foreign Application Priority Data
Jul. 1, 1986 [JP] Japan .................... 61-154696

[51] Int. Cl.[4] .............................. B60K 41/04
[52] U.S. Cl. .......................... 74/868; 74/867
[58] Field of Search .................. 74/867, 868, 869

[56] References Cited
U.S. PATENT DOCUMENTS

| | | | |
|---|---|---|---|
| 3,559,669 | 2/1971 | Dach | 192/52 X |
| 3,593,599 | 7/1971 | Dach | 74/869 |
| 3,610,070 | 10/1971 | Dach | 74/869 X |
| 3,938,410 | 2/1976 | Dach et al. | 74/869 |
| 4,005,620 | 2/1977 | Dach et al. | 74/869 X |
| 4,200,008 | 4/1980 | Dach | 74/869 |

FOREIGN PATENT DOCUMENTS

| | | |
|---|---|---|
| 47-7052 | 2/1972 | Japan . |
| 47-50060 | 12/1972 | Japan . |
| 59-27465 | 7/1984 | Japan . |
| 59-48902 | 11/1984 | Japan . |
| 59-49452 | 12/1984 | Japan . |

Primary Examiner—Leslie A. Braun
Assistant Examiner—Christopher Campbell
Attorney, Agent, or Firm—Wenderoth, Lind & Ponack

[57] ABSTRACT

A hydraulic servo regulating device of an automatic transmission, which according to the present invention applies enough line pressure quickly to a hydraulic servo and obviates a delay when the line pressure is to be drained, is disposed in an oil path between a shift valve and an accumulator. The device employs regulator valve which has an application port connected to a shift valve, a regulating port in selective communication with the application port, a first feedback port through which feedback pressure is applied to one end of a spool, a second feedback port through which feedback pressure is applied to the other end of the spool, a spring and a drain port connected to the regulating port. Furthermore, the regulating port communicates with a hydraulic servo through a first oil path, and an accumulator chamber through a second oil path having an orifice and branched off from the first oil path. And, the regulator valve also communicates with the first feedback port through a third oil path having an orifice and branched off from the first oil path, and the second feedback port through an oil path branched off from the second oil path. A fourth oil path connects the first oil path and is branched off from the second oil path, and a check valve which controls oil flow from the second oil path to the first oil path is disposed in the fourth oil path.

2 Claims, 3 Drawing Sheets

FIG.4

| POSITION | | SOLENOID | | | | CLUTCH | | | | BRAKE | | | | O.W.C | | | |
|---|---|---|---|---|---|---|---|---|---|---|---|---|---|---|---|---|---|
| | | 51 | 52 | 53 | 54 | $C_0$ | $C_1$ | $C_2$ | $C_3$ | $B_1$ | $B_2$ | $B_3$ | $B_4$ | $F_0$ | $F_1$ | $F_2$ | $F_3$ |
| P | | × | ○ | × | | | | | | | | | ○ | | | | |
| R | STOPPING | × | ○ | × | | | ○ | | | | | ○ | ○ | | | | |
| | RUNNING | ○ | ○ | × | | | ○ | | | | | × | ○ | | | | |
| N | | × | ○ | × | | | | | | | | | ○ | | | | |
| D | idle | × | ○ | ○ | | | △ | | | ○ | | | ○ | | | | |
| D | 1ST | × | ○ | × | | | ○ | | | | | | ○ | | | ○ | ○ |
| | 2ND | ○ | ○ | × | ◎ | | ○ | | | | ○ | | ○ | | ○ | | ○ |
| | 3RD | ○ | × | × | ◎ | | ○ | ○ | | | ○ | | ○ | | ○ | | |
| | 4TH | × | × | × | ◎ | ○ | ○ | ○ | | | ○ | | ○ | | | | |
| | 5TH | × | × | ○ | ◎ | ○ | | | ○ | ○ | ○ | | | ○ | | | |
| 3 | 1ST | × | ○ | × | | | ○ | | | | | | ○ | | | ○ | ○ |
| | 2ND | ○ | ○ | × | ◎ | | ○ | | | | ○ | | ○ | | ○ | | ○ |
| | 3RD | × | × | × | ◎ | ○ | ○ | | | | ○ | | ○ | ○ | | | ○ |
| | 4TH | × | × | ○ | ◎ | ○ | | | | ○ | ○ | | ○ | ○ | | | ○ |
| 2 | 1ST | × | ○ | × | | | ○ | | | | | ○ | ○ | | | ○ | ○ |
| | 2ND | × | × | × | | | ○ | ○ | | | | ○ | | | | ○ | |
| | (2ND) | ○ | ○ | × | | | ○ | | | ○ | ○ | | ○ | | ○ | | ○ |
| | (3RD) | ○ | × | × | | | ○ | ○ | | ○ | ○ | | | | ○ | | |
| 1 | 1ST | × | ○ | × | | | ○ | | | | | ○ | ○ | | | ○ | ○ |
| | (2ND) | × | × | × | | | ○ | ○ | | | | ○ | | | | ○ | |
| | (3RD) | ○ | × | × | | | ○ | | | ○ | ○ | ○ | | | ○ | | |

| REMARKS | | |
|---|---|---|
| ○ | ON | |
| × | OFF | |
| ◎ | ON: L-UP ON / OFF: L-UP OFF | |
| △ | | PRESSURE REDUCTION |

HYDRAULIC SERVO REGULATING SYSTEMS IN AN AUTOMATIC TRANSMISSION

BACKGROUND OF THE INVENTION

1. Field of the Invention

The present invention relates to a hydraulic servo regulating systems of frictional engaging means in an automatic transmission of an automobile, particularly to a regulating system comprising regulator valves, etc., which are disposed in oil paths extending between shift valves, hydraulic servos and accumulators.

2. Description of the Prior Art

An automatic transmission, in general, has a gear mechanism such as a planetary gear mechanism whose components are engaged or restrained by clutches or brakes (frictional engaging means) to obtain a desired speed. These frictional engaging means are conrolled by hydraulic servos to which line pressure is applied or drained by the shifting of the shift valves. Each hydraulic servo has an accumulator, and line pressure is applied from the shift valve to the accumulator through an orifice. Due to the above structure, a surge in the line pressure applied to the hydraulic servo is prevented, and the degree of frictional engagement is determined based on a hydraulic characteristic of the accumulator.

The hydraulic servo is rotating when the clutch is engaged. At this time the oil is subjected to a centrifugal force as it is drained from the servo. Centrifugal force is effective in the servo to create residual hydraulic pressure. To release the residual hydraulic pressure, a check valve for draining oil under the centrifugal force is incorporated in a piston. Consequently, in the hydraulic servo having the check valve, a rise in line pressure is not attained because oil leaks from the check valve unless higher line pressure is generated which is sufficient to overcome the centrifugal force. For the above reasons, in the case of the prior systems which apply line pressure to the hydraulic servo through an orifice, a malfunction may occur because oil is supplied rather slowly and the volume is comparatively small, so that enough line pressure to overcome the centrifugal force cannot be generated. In addition to the above, to obtain the necessary degree of frictional engagement, an accumulator having a sufficient capacity is required because the degree of frictional engagement is determined by the hydraulic characteristics of the accumulator. This hampers the minimization of the accumulator contrary to the desirability of compact automatic transmissions.

Furthermore, when the frictional engaging means is released, oil in the accumulator and the hydraulic servo flows through a check valve disposed in parallel with the orifice. The oil is drained through the shift valve. Due to this, a path through which oil is drained is relatively long. Accordingly, a draining efficiency is diminished because of pipe-resistance contributing to relatively poor performance of the releasing of the frictional engaging means.

SUMMARY OF THE INVENTION

An object of the present invention is to provide a hydraulic servo regulating system in an automatic transmission which quickly supplies enough line pressure when a frictional engaging means is to be engaged, and does not delay when draining line pressure when a frictional engaging means is to be released. An accumulator and a regulator valve are employed to carry out such a function.

While the invention is believed to be readily understood from the above description, a further summary will now be set forth.

As shown in FIG. 1, the system comprises a hydraulic servo (1) of a frictional engaging member, an accumulator (2), a shift valve (3) and a regulator valve (5). The regulator valve has an application port (5a) communicating with the shift valve (3), a regulating port (5b) in selective communication with the port (5a), a first feedback port (5d) applying feedback line pressure to one side of a spool (5c), a second feedback port (5e) applying feedback pressure to another side of spool (5c), and a spring-means (6). The regulating port (5b) is connected to the hydraulic servo (1) through a first oil path (7), and is connected to an accumulator chamber (2a) of the accumulator (2) through a second oil path (9) branched from the first oil path (7). Furthermore, the port (5b) is also connected to a first feedback port (5d) through a third oil path (11) branched from the first oil path (7), and is connected to a second feedback port (5e) through an oil path (13) branched from the second oil path (9).

In addition, a drain port (5f) in selective communication with the regulating port (5b) is provided on the regulator valve (5), an orifice (10) is disposed in the second oil path (9), and an orifice (12) is disposed in the third oil path (11). A fourth oil path (15) is branched from second oil path (9) and is connected to first oil path (7). And, a check valve (16) is provided which allows oil flow from the fourth oil path (15) to the first oil path (7).

Reference numeral (17) in FIG. 1 designates an accumulator control valve which applies line pressure to a back-pressure chamber (2b) of the accumulator (2).

Based on the above structure, when the shift valve (3) is disconnected in the system, the regulator valve (5) is urged to the "lower half position" by the spring means (6). From this state, by shifting the shift valve (3), line pressure is applied to the application port (5a), and then, line pressure is quickly applied to the hydraulic servo (1) through the regulating port (5b) and the first oil path (7). During the above operation, centrifugal force is exerted on the ball of the check valve. However, at such a time, because of the quick application of line pressure that is not affected by an orifice, the ball of the check valve is restrained against the centrifugal force. Accordingly, line pressure is assuredly applied to the hydraulic servo (1). At the same time, line pressure at the port (5b) is applied to the first feedback port (5d) through the third oil path (11) having the orifice (12), and the line pressure moves the spool (5c) against the spring means (6). Then, the openings of the ports (5a) and (5b) are narrowed to attain the necessary line pressure level. Also at the same time, line pressure at the regulating port (5b) is applied to the accumulator chamber (2a) of the accumulator (2) through the second oil path (9) having the orifice (10). In the accumulator (2), the piston (2c) is moved by line pressure against the spring (2d), and line pressure is also applied to the second feedback port (5e) through the oil path (13). In accordance with the spring constant of the accumulator (2), feedback pressure applied to the left side of the spool (5c) gradually increases. Then, line pressure at the regulating port (5b) smoothly increases. Due to the above operation, the frictional engaging means starts engaging smoothly. Then, the accumulator (2) assumes the "right half position" so that the motion of the piston (2c) is stopped. At this time, feedback pressure at the second feedback port (5e) and at the first feedback port (5d) become equal so that the spool (5c) moves to the "lower half position". Accordingly, the application port (5a) and the regulating port (5b) are open to each other and line pressure is applied to the hydraulic servo (1).

On the other hand, line pressure at the application port (5a) is drained by shifting the shift valve (3), and line pressure at the regulating port (5b) and in the first oil path (7) is decreased. Since the line pressure is still exerted in the second oil path (9) due to the orifice (10) and the accumulator (2), the check valve (16) is released. Accordingly the line pressure at the second feedback port (5e) is decreased to zero. Under this condition, feedback pressure in the first feedback port (5d) is still exerted on the spool (5c) so that the spool (5c) is moved to the "upper half position" against the spring means (6). Then, the regulating port (5b) is connected to the drain port (5f). Consequently, line pressure in the hydraulic servo (1) is drained from the drain port (5f) without having to pass through the shift valve (3), and line pressure in the accumulator chamber (2) is drained from the drain port (5f) through the check valve (16).

As explained above, in the present invention, enough line pressure to the hydraulic servo (1) is applied quickly due to the regulating valve (5), so that the frictional engaging means is engaged quickly and smoothly. Particularly, even though the hydraulic servo has the check valve, line pressure is assuredly applied quickly to the hydraulic servo (1), and a malfunction can be prevented.

The accumulator (2) can contribute to minimize the size of an automatic transmission because a small accumulator can be used in the present invention because the accumulator (2) is used only to establish a regulating level and time. Furthermore, as shown in this hydraulic system, the check valve (16) and the drain port (5f) aid in the draining of the hydraulic servo (1) and the accumulator (2) without the draining being performed through the shift valve (3) when the hydraulic servo (1) is released. Accordingly, a releasing efficiency of the frictional engaging means and the responsiveness of the automatic transmission are enhanced. Particularly, although employing the regulator valve (5) would tend to delay the draining of the accumulator (2), the line pressure in the accumulator is drained directly through the check valve (16) and the drain port (5f) of the regulator valve (5), so that such a draining delay is prevented.

It is to be noted that all numbers and symbols in parenthesis in "SUMMARY OF THE INVENTION" are for reference purposes and do not limit the invention as set forth in the claims.

BRIEF DESCRIPTION OF DRAWINGS

In the accompanying drawings,

FIG. 4 is an operation table.

DETAILED DESCRIPTION OF THE PREFERRED EMBODIMENT

The following is a detailed description of preferred embodiments according to the present invention.

Figure 2:
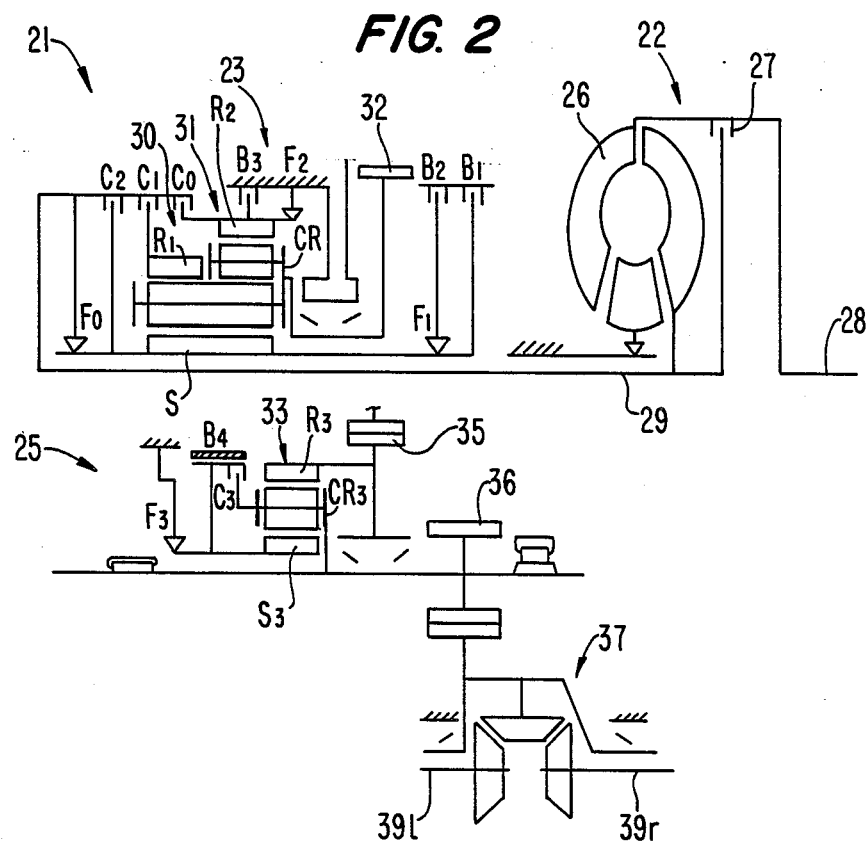
FIG. 2 is a schematic view of an automatic transmission to which the present invention may be applied.

A five speed automatic transmission 21 comprises a torque converter portion 22, a four speed automatic transmission mechanism portion 23 and an underdrive mechanism portion 25, as shown in FIG. 2.

The torque converter portion 22 includes a torque converter 26 and a lock-up clutch 27. The engine crankshaft 28 is connected with the input shaft 29 through oil by the torque converter 26 or through a mechanical coupling by the lock-up clutch 27.

The four speed automatic transmission mechanism portion 23 has a single planetary gear unit 30 and a dual planetary gear unit 31. Each gear unit has a carrier CR and a sun gear S. The carriers CR are connected with each other to form an integrated body; and the sun gears are connected to each other to form an integrated body, too. Still further, the input shaft 29 is coupled with the ring gear $R_1$ of the single planetary gear unit 30 through the first clutch $C_1$ and is also coupled with the sun gear S through the second (direct) clutch $C_2$. The sun gear S is braked directly by the first brake $B_1$ and the rotation thereof in one direction is regulated by the second brake $B_2$ through the first one-way clutch F. The ring gear $R_2$ of the dual planetary gear unit 31 is braked directly by the third (1st & Rev) brake $B_3$ and the rotation of the ring gear $R_2$ in one direction is regulated by the second one-way clutch $F_2$. Furthermore, the input shaft 29 is connected with the ring gear $R_2$ of the dual planetary gear 31 through the third clutch $C_0$ and a third one-way clutch $F_0$ is operatively connected between the input shaft 29 and the sun gear S in order to limit the rotation of the sun gear S to that of the input shaft 29. Further, the carrier CR is connected with the counterdrive gear 32 which is the output member of the four speed automatic transmission mechanism portion 23.

On the other hand, the underdrive mechanism portion 25 comprises a single planetary gear unit 33 including the ring gear $R_3$ which is connected with a counterdriven gear 35 which is always engaged with said counterdrive gear 32; and a carrier $CR_3$ is connected with the output pinion 36. Further, the rotation of the sun gear $S_3$ in one direction is regulated by the fourth one-way clutch $F_3$; and the sun gear $S_3$ is braked by the fourth brake $B_4$ and is coupled with the carrier $CR_3$ through the fourth clutch $C_3$.

As for the output pinion 36, it is connected with the right and left axles 39r, 39l through the differential device 37.

Figure 3:
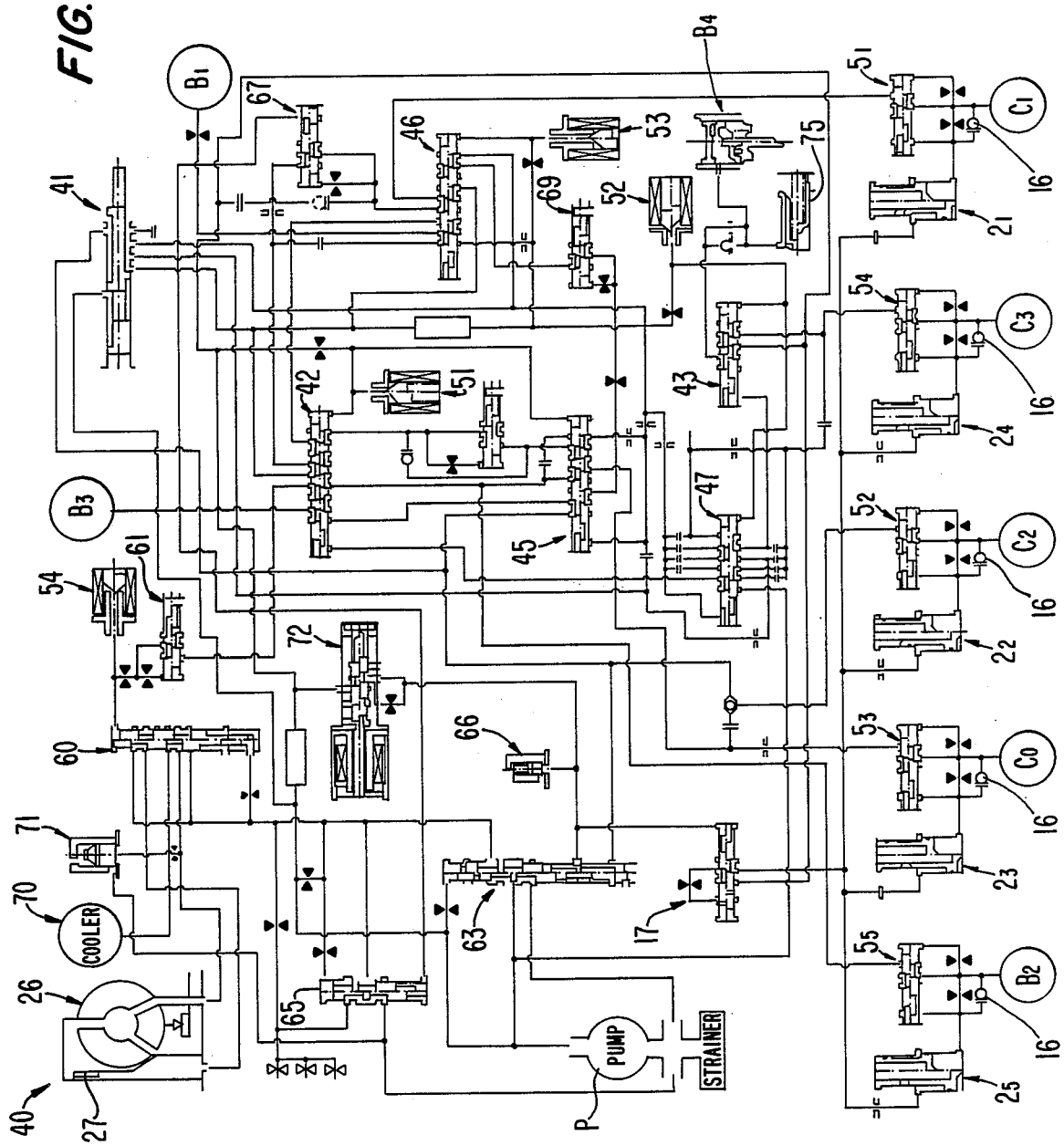
FIG. 3 is a hydraulic circuit of the present invention.

The five-speed automatic transmission 21 is controlled and operated by the hydraulic circuit 40 shown in FIG. 3.

In this circuit 40, $C_0$, $C_1$, $C_2$ and $C_3$ are the hydraulic servos for the clutches, and $B_1$, $B_2$, $B_3$ and $B_4$ are the hydraulic servos for the brakes. Reference numeral 41 designates a manual valve, 42 the (1-2) shift valve, 43 the (2-3) shift valve, 45 the (3-4) shift valve, 46 the (4-5) shift valve and 47 a down shift control valve. Reference numeral 51 designates a first solenoid valve to control the first and second shift valves 42, 45. Reference numeral 52 designates a second solenoid valve to control the third shift valve 43 and the down shift control valve 47. Reference numeral 53 designates a third solenoid valve to control the shift valve 46. Reference numeral 60 designates a lock up control valve, 54 a fourth solenoid valve to duty-control the lock-up control valve, and 61 a lock-up modulator valve to stabilize the duty-control by the fourth solenoid valve 54. Reference numeral 63 designates a primary regulator valve, 65 a secondary regulator valve, 66 a pressure release valve, 67 a C1 modulator valve, and 69 a low modulator valve. Reference numeral 70 designates a cooler, 71 a cooler by-pass valve and 72 a throttle valve comprising a linear solenoid valve to control line pressure up to the necessary level. Reference numeral 17 designates an accumulator control valve, 26 the torque converter, 27 the lock-up clutch, and "P" a hydraulic pump.

In FIG. 3, a symbol, similar to that used to represent a capacitor, represents a separator plate to block oil paths when the hydraulic device is utilized in a four speed automatic transmission.

The first hydraulic servo of clutch $C_1$, that of the second $C_2$, that of the third $C_0$, that of the fourth $C_3$, and the second hydraulic servo of brake $B_2$ are connected to the regulator valves $5_1$, $5_2$, $5_3$, $5_4$, $5_5$, the accumulators $2_1$, $2_2$, $2_3$, $2_4$, $2_5$ and the check valve 16. The accumulator 75 (installation type) is connected to the fourth brake hydraulic servo $B_4$.

Now, the operation of the present invention will be described in detail.

A five-speed automatic transmission 21 provides the first to the fifth speed of each range set by the manual valve 41. At each range set by the manual valve, the first to the fourth solenoid valves 51, 52, 53, 54 in the hydraulic control circuit 40 operate in accordance with FIG. 4 and the clutches $C_0$-$C_3$, the brakes $B_1$-$B_4$, and the one way clutches $F_0$-$F_3$ are controlled by the solenoid valves.

Figure 1:
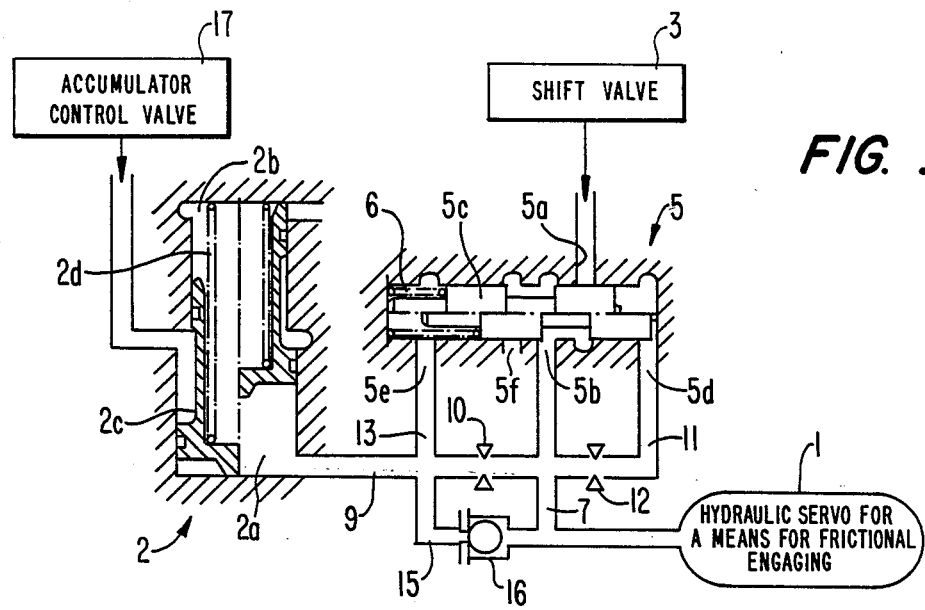
FIG. 1 is a cross-sectional view of a hydraulic servo adjusting system according to the present invention.

At the first speed in D range, in the automatic transmission 21, the first forward clutch $C_1$ is engaged and the fourth brake $B_4$ operates. The rotation of the input shaft 29 is transmitted to the ring gear $R_1$ of the single unit 30 through the clutch $C_1$. At this time, since the ring gear $R_2$ of the dual unit 31 is restrained by the second one-way clutch $F_2$, the ring gear $R_2$ rotates the sun gear S without load in a reverse direction, and the common carrier CR is rotated at a retarded speed. The rotation is transmitted from the counterdrive gear 32 to the counterdriven gear 35 of the under drive mechanism 25. The underdrive mechanism 25 is in an "under drive condition" due to the states of the fourth brake $B_4$ and the fourth one-way clutch $F_3$. Consequently, the automatic transmission 21 outputs the first (1st) speed due to the combination of the first speed of the four speed automatic transmission 23 and the underdrive condition of the underdrive mechanism 25. At this moment, since the first hydraulic clutch servo C1 having the check valve 16 is rotating with input shaft 29, line pressure through the shift valve 3, as shown in FIG. 1, is applied quickly to the hydraulic servo 1 through the port 5a, the regulating port 5b and the oil path 7. Then, said line pressure closes the check valve against centrifugal force, and is ensuredly applied to said hydraulic servo 1. Line pressure at the regulating port 5b is applied to the feedback port 5d through the oil path 11 having orifice 12, and moves the spool 5c against the spring 6 to obtain necessary pressure by narrowing the opening of ports 5a and 5b. At this time, line pressure from the regulating port 5b is applied to the accumulator chamber 2a through the second oil path 9 having the orifice 10, moves the piston 2c against the spring 2d, and is also applied to the second feedback port 5e through the oil path 13. Due to the above consecutive operations, feedback pressure at the left side of the spool 5c is gradually increased in accordance with the spring constant of the accumulator 2. Accordingly, the application port 5a is gradually opened, and line pressure at the regulating port 5b is smoothly and gradually increased. Then, the first clutch C1 is engaged smoothly. The accumulator 2 assumes the "right half position", so that the motion of the piston 2c is restrained. At this moment, feedback pressure of the second feedback port 5e and that of the first feedback port 5d become equal, and the spool 5c moves to the "lower half position". Accordingly the application port 5a and the regulating port 5b are placed in open communication and then, line pressure is applied to the hydraulic servo C1.

At the second speed in D range, the first clutch C1 is engaged and the second brake $B_2$ operates. Then, the rotation of the sun gear S is restrained by the first one-way clutch $F_1$, the rotation of the ring gear R1 transmitted from the input shaft 29 rotates the ring gear R2 of the dual unit 31 without load, and rotates the carrier CR at a retarded speed. This rotation is transmitted from the counterdrive gear 32 to the counterdriven gear 35 of the underdrive mechanism 25. The mechanism 25 is in an "under drive condition". Consequently, the automatic transmission 21 outputs the second speed due to the combination of the second speed of the four-speed automatic transmission 23 and the underdrive condition of the underdrive mechanism 25. During the above sequence, the second brake hydraulic servo $B_2$ as well as the first clutch hydraulic servo C1 are subjected to line pressure regulated by the regulator valve $5_5$.

At the third speed in D range, the four-speed automatic transmission 23 is kept under the second speed, the fourth brake $B_4$ is released, and the fourth clutch $C_3$ is engaged. Then, the underdrive mechanism 25 is directly connected with the four-speed automatic transmission 23. The automatic transmission outputs the third speed due to the combination of the second speed of the four-speed automatic transmission 23 and direct coupling of the underdrive mechanism 25. At this time, the fourth clutch hydraulic servo $C_3$ is subjected to line pressure via the regulator valve $5_4$.

At the fourth speed in D range, the first clutch $C_1$, the fourth clutch $C_3$ and the third $C_0$ are engaged in addition to the application of the second brake $B_2$. Then, the rotation of the input shaft 29 is transmitted to the ring gear $R_1$ of the single unit 30 through the first clutch C1. At the same time, the rotation of the input shaft 29 is transmitted to the ring gear $R_2$ of dual unit 31 through clutch $C_0$. Then, components of the planetary gear units 30 and 31 rotate together, and, via the carrier CR, the rotation of the input shaft 29 is transmitted to the counterdrive gear 32 to rotate gear 32 at the same speed. Consequently, the automatic transmission 21 outputs the fourth speed due to the combination of the direct coupling condition in the four-speed automatic transmission 23 and direct coupling of the underdrive mechanism 25 with the transmission 23. At this time, the third clutch hydraulic servo $C_0$ is subjected to line pressure from the regulator valve $5_3$.

At the fifth speed in D range, the first clutch $C_1$ is disengaged and the first brake $B_1$ operates. The rotation of the input shaft 29 is transmitted to the ring gear $R_2$ of the dual unit 31 through the clutch $C_0$. At this time, since the sun gear S is restrained, the shaft 29 rotates the ring gear $R_1$ of the single unit rapidly without load. Then, the high speed rotation is transmitted to the counterdrive gear 32 as an "over drive". Consequently, the automatic transmission 21 outputs the fifth speed due to the combination of the over drive of the four-speed automatic transmission 23 and the direct coupling of the underdrive mechanism 25 with the transmission 23. At this time, due to the third solenoid valve 53 being switched ON, the shift valve 46 is shifted to the "upper half position", and line pressure at the application port $5a$ of the regulator valve $5_1$ is drained. Then line pressure in the regulating port $5b$ and the first oil path 7 is decreased to zero. However, since line pressure is still applied to the second oil path 9 by the accumulator 2, the check valve 16 is released and the line pressure at the second feedback port $5e$ is decreased to zero. Under this condition, since the feedback line pressure is still applied from the feedback port $5d$ to the spool $5c$, the spool $5c$ assumes the "upper half position". Then regulating port $5b$ is connected to the drain port $5f$. Due to this operation, the oil in the hydraulic servo $C_1$ is drained from the drain port $5f$ without passing through the shift valve 3 (46), and the oil in the accumulator chamber $2a$ is drained from the drain port $5f$ through the check valve 16.

In addition to the above, during a down shifting, the clutches $C_0$, $C_2$, $C_3$ and the brake $B_2$ are released, and each hydraulic servo, similar to the first hydraulic servo $C_1$, is drained via the drain port $5f$ of each respective regulating valve connected thereto.

To establish idling in D range, line pressure to the first clutch servo $C_1$ is reduced by the $C_1$ modulator valve 67 to a level just below the level to engage the clutch, and the first brake $B_1$ works. The load is released from the input shaft 29, creeping is prevented and the first clutch $C_1$ is rapidly engaged when the mode is changed to 1st speed. Since the first brake $B_1$ is operating, regression of the vehicle on a slope is prevented.

When shifting from N to R range, when the vehicle speed is lower than certain speed (less than 7 km/h) or 0 (zero), the clutch $C_2$ is engaged and the third brake $B_3$ (1st reverse) operates. The rotation of the input shaft 29 is transmitted to the sun gear S through the clutch $C_2$. Under this condition, the input shaft 29 rotates the ring gear $R_1$ of the single unit 30 and the carrier CR in a reverse direction because the ring gear $R_2$ of the dual unit 31 is restrained by the third brake $B_3$. The reverse rotation of the carrier CR is transmitted to the underdrive mechanism 25, which is in an under drive condition, via the counter-drive gear 32.

When shifting from N to R range, when the vehicle speed is higher than a certain speed (7 km/h), the solenoid valve S1 is switched "ON", the (1-2) shift valve 11 and the (3-4) shift valve 12 are shifted, and the third brake $B_3$ is released. By this operation, shifting to R range when the vehicle is moving is prevented.

At 3 range, 1st and 2nd speeds are established in the same manner as D range, but 3rd and 4th speeds are established with a different gear ratio. That is to say, the first clutch $C_1$ and the third clutch $C_3$ are engaged, and the second brake $B_2$ and the fourth brake $B_4$ operate. The four speed automatic transmission mechanism 23 assumes a direct coupling condition and the under drive mechanism 25 assumes the under drive condition. Then the 3rd speed of 3 range is output.

Consequently, in the automatic transmission 21, the third clutch $C_0$ is engaged, and the first, second and fourth brake ($B_1$, $B_2$ and $B_4$) operate. Then, the four speed automatic transmission mechanism 23 assumes the over drive condition and the underdrive mechanism 25 assumes the underdrive condition. Thus, the fourth stage of 3 range is output.

At 2 range, under the first speed condition (1st) the third brake $B_3$ operates in addition to transmission being in the same state as in the first speed of D range. Consequently, when an engine brake occurs, the output of 1st speed at 2 range is maintained because of the ring gear $R_2$ being restrained by the third brake $B_3$. On the other hand, in D range, the transmission is disconnected by the one-way clutch $F_2$. At the second (2nd) speed of 2 range, the first and the fourth clutches ($C_1$ and $C_3$) are engaged and the third brake $B_3$ operates. Then, the four speed automatic transmission mechanism 23 outputs 1st speed and the underdrive mechanism 25 assumes a direct coupling condition; thus, the transmission outputs 2nd speed in 2 range. At this time, as when the 1st speed is output, an engine brake is maintained because the third brake $B_3$ is operating. At 2 range, it is possible to obtain 2nd and 3rd speeds as in D range as shown in the parentheses.

Furthermore, at 1 range, 1st speed is established in the same manner as in 2 range. As shown in the parentheses, 2nd speed, as in 2 range, and 3rd speed, as in D range, can be obtained.

The hydraulic servo regulating device according to the present invention is applicable to automobiles, trucks, small cars and special purpose cars. As the case may be, the hydraulic servo regulating device of the present invention can be applied to a hydraulic circuit having an accumulator.

In the above-mentioned embodiments, a five-speed automatic transmission comprising the four-speed automatic transmission mechanism and the underdrive mechanism is set forth, but it is clear that the present invention may be applied to a four-speed automatic transmission having a three-speed automatic transmission mechanism and an underdrive mechanism or a multiple-speed automatic transmission.

Furthermore the present invention can be applied to Simpson Type and Ravigneaux Type automatic transmissions.

We claim:

1. In an automatic transmission of a vehicle having a transmission unit through which power is transmitted in a respective one of power transmitting paths defined therethrough, frictional engaging means operatively connected to the transmission unit for selecting the power transmitting path through which power is transmitted in the transmission unit, hydraulic servos operatively connected to the frictional engaging means for operating or releasing or for engaging or disengaging the frictional engaging means, accumulators operatively hydraulically connected to the hydraulic servos, and a plurality of shift valves operatively hydraulically connected to the hydraulic servos and a source of line pressure and which shift valves are movable between respective positions at which the line pressure is supplied toward the servos and respective positions at which the supply of line pressure is interrupted, a hydraulic servo regulating system comprising:

a regulator valve operatively connected to one of the hydraulic servos, one of the accumulators and one of the shift valves, said regulator valve having an application port in hydraulic communication with said one of the shift valves, a regulating port, a spool interposed between said application port and said regulating port and movable between a position at which said ports are open to one another and a position at which said ports are closed to each other, a first feedback port open to one end of said spool and through which feedback pressure passes to act on said spool at said one end thereof, a second feedback port open to another end of said spool and through which feedback pressure passes to act on said spool at said another end thereof, a spring means connected to said spool for exerting an urging force on said spool at said another end thereof, and a drain port openable and closable to said regulating port;

the system defining a first oil passage placing said regulating port in hydraulic communication with said one of said hydraulic servos, a second oil passage open to said first oil passage and placing said regulating port in hydraulic communication with said one of said accumulators, a third oil passage open to said first oil passage and placing said regulating port in hydraulic communication with said first feedback port, a fourth oil passage extending between and open to said second oil passage and said first oil passage, and a branch oil passage open to said second oil passage and placing said regulating port in hydraulic communication with said second feedback port;

a first orifice disposed in said second oil passage;

a second orifice disposed in said third oil passage; and a check valve disposed in said fourth oil passage and allowing oil to flow in said fourth oil passage from said second oil passage toward said first oil passage.

2. A hydraulic servo regulating system as claimed in claim 1, and in which said one of said hydraulic servos rotates in the transmission unit, with the respective frictional engaging means to which said one of said hydraulic servos is operatively connected, when said frictional engaging means is operated or engaged, wherein said check valve rotates with said one of said hydraulic servos and comprises a valve seat and a ball, said ball seated on said valve seat under pressure at said one of said hydraulic servos while said respective frictional engaging means is operated or engaged and is rotating, and said ball moved off of said valve seat under centrifugal force when oil is drained from said respective frictional engaging means.

* * * * *